US007853249B2

(12) United States Patent
Regnier

(10) Patent No.: US 7,853,249 B2
(45) Date of Patent: Dec. 14, 2010

(54) SYSTEMS AND METHODS FOR CHOREOGRAPHING MOVEMENT

(76) Inventor: Patrice M. Regnier, 392 Broadway #3F, New York, NY (US) 10013

( * ) Notice: Subject to any disclaimer, the term of this patent is extended or adjusted under 35 U.S.C. 154(b) by 1535 days.

(21) Appl. No.: 11/116,049

(22) Filed: Apr. 27, 2005

(65) Prior Publication Data

US 2006/0245599 A1 Nov. 2, 2006

(51) Int. Cl.
*H04M 3/00* (2006.01)

(52) U.S. Cl. .................. 455/420; 455/414.2; 455/41.2; 455/502

(58) Field of Classification Search ... 455/414.1–414.4, 455/418, 419, 420, 456.3, 41.1, 41.2, 502, 455/511, 68; 340/573.1; 715/500.1
See application file for complete search history.

(56) References Cited

U.S. PATENT DOCUMENTS

| | | | | |
|---|---|---|---|---|
| 4,408,187 | A | 10/1983 | Rollins | 340/332 |
| 4,917,373 | A | 4/1990 | Bourne et al. | 272/9 |
| 5,589,654 | A | 12/1996 | Konwiser et al. | 84/600 |
| 6,462,662 | B1 * | 10/2002 | Rondow et al. | 340/573.1 |
| 6,898,759 | B1 * | 5/2005 | Terada et al. | 715/202 |
| 2002/0155416 | A1 * | 10/2002 | Barton | 434/247 |
| 2006/0029913 | A1 * | 2/2006 | Alfieri | 434/169 |
| 2008/0043203 | A1 * | 2/2008 | Jacobs et al. | 352/63 |

* cited by examiner

*Primary Examiner*—John Lee
(74) *Attorney, Agent, or Firm*—Winston & Strawn LLP

(57) ABSTRACT

Methods and apparatus for choreographing and synchronizing movement of individuals for an event are disclosed. In an embodiment, a method includes providing each individual of a group with a wireless audio playback unit, and transmitting body movement instruction signals to the audio playback units of each individual of the group. The audio playback units are configured to receive the signals and to play audio directions for each individual that correspond to choreographed and coordinated body movements to carry out the event.

20 Claims, 7 Drawing Sheets

SYSTEMS AND METHODS FOR CHOREOGRAPHING MOVEMENT

FIELD OF THE INVENTION

The invention generally relates to systems for machine control of human actions. In an implementation, the invention is a multimedia composition tool that utilizes software on a computer system to generate a series of scored commands on a timeline corresponding to a choreographed piece, and then transmits the commands to a group or groups of people who perform the piece.

BACKGROUND ART

Rehearsing new choreography can be time consuming as even trained dancers must learn individual movements in the context and phrasing of all movements of a piece. The most time consuming difficulty is not in having a trained dancer learn individual movements, but in having the dancer learn the movements in the context or phrasing of those movements. In order for a dancer to successfully put movement A after movement B, followed by movement C, it is necessary for the dancers' body to learn that sequence before the dancer can reproduce it in a manner that the choreographer or audience might see it, as the actual performance of the idea.

Simple cueing systems are known for use in the performing arts, but are not intended as an aid for reducing rehearsal time. It has been recognized that actors, musicians, dancers and other performers must be alerted when performing to the need to initiate certain actions, and oral cueing or directing has been used for decades for this purpose. However, oral cueing can create problems. For example, during the production of a filmed entertainment, audio directions or voice cues can result in unwanted sounds on film audio tracks, missed instructions because one or more performers did not hear the instructions, difficulties in directing multiple performers without human error, and an inability to direct some performers who are either too far away to hear or are in enclosed areas where audible directions cannot be heard.

Thus, there exists a need for methods and systems that can be used with performers to make it possible to create instant choreography, as if it had been rehearsed. Such systems and methods would dramatically aid the rehearsal process, so that a choreographed piece can be performed by a group or groups of persons efficiently without the need for hours of rehearsals.

SUMMARY OF THE INVENTION

The present invention relates to a method and apparatus for choreographing and synchronizing movement of individuals for an event. One method includes providing each individual of a group with a wireless audio playback unit, and transmitting body movement instruction signals to the audio playback units of each individual of the group. The audio playback units are configured to receive the signals and to play audio directions for each individual that correspond to choreographed and coordinated body movements to carry out the event.

In another embodiment, the body movement instruction signals are transmitted to the audio playback units under the control of a suitably programmed computer and wireless transmitter. At least some of the individuals may be, and preferably are, remotely located from others in order to achieve a multi-locational or multi-geographical event. The body movement instruction signals may include voice commands, and such voice commands may include coded commands that are selected from a compilation that is provided to the individuals. The method may also advantageously include synchronizing the voice commands with at least one of music accompaniment, visual effects or changing scenery. In addition, the method may include providing choreographic movements to additional individuals that do not have audio playback units to further enhance the event. In an implementation, the event is an artistic performance, an exercise regimen or an interactive game, and the movements of the individuals of the group or groups are choreographed and coordinated to carry out the event.

Another aspect of the invention pertains to a multi-channel system for choreographing and synchronizing movement of individuals. In an embodiment, the system includes a device including at least one display and input means for generating body movement instruction signals, a transmitter for transmitting the body movement instruction signals over at least one channel, and a wireless audio playback unit provided to each individual of a group for receiving the body movement instruction signals. The signals are interpreted by the audio playback units into audible body movement directions for each individual such that the individuals move in a choreographed and coordinated manner.

In an advantageous embodiment, the multi-channel system also includes a second display for showing a representation of the movement of the performers. Beneficially, the wireless audio playback receiving unit includes a microprocessor, a digital media card, and a headset with audio speakers. In an implementation, the device for generating body movement instruction signals includes at least one of a MIDI keyboard, a MIDI digital device, an APPLE® personal computer, and a personal computer running a WINDOWS® operating system. In addition, the apparatus may include a digital media read/write unit. Advantageously, the multi-channel system also includes choreographing software provided on the device for generating body movement instructions, to facilitate creation of a choreographed event. In a preferred embodiment, the audio playback unit is capable of two-way communication with the device.

Another embodiment of the invention pertains to a computer program product, residing on a computer readable medium, for generating a choreographed piece for transmission to individuals. The computer program product includes instructions for causing a computer to provide at least one track and cues for defining a sequence of choreographing instructions over a timeline to generate a choreographed piece, store at least a portion of the choreographed piece, and generate command signals corresponding to the choreographing instructions for transmission on at least one channel to wireless audio playback units. Each wireless audio playback unit is associated with an individual of at least one group and is configured to translate the command signals into audio body movement directions such that a choreographed event can be performed.

In an advantageous variation of this embodiment, the choreographing instructions include at least one of movement instructions, states, and properties. In addition, the computer program product may include instructions for causing a computer to generate optional command signals to synchronize outside events with the choreographed event, and/or may include instructions for causing a computer to learn and categorize additional choreography instructions. In a beneficial embodiment, the computer program product includes instructions for causing a computer to automatically update movement instructions according to predefined popularity criteria.

BRIEF DESCRIPTION OF THE DRAWINGS

Other aspects, purposes and advantages of the invention will become clear after reading the following detailed description with reference to the attached drawings, in which.

DETAILED DESCRIPTION OF THE PREFERRED EMBODIMENTS

Figure 1:
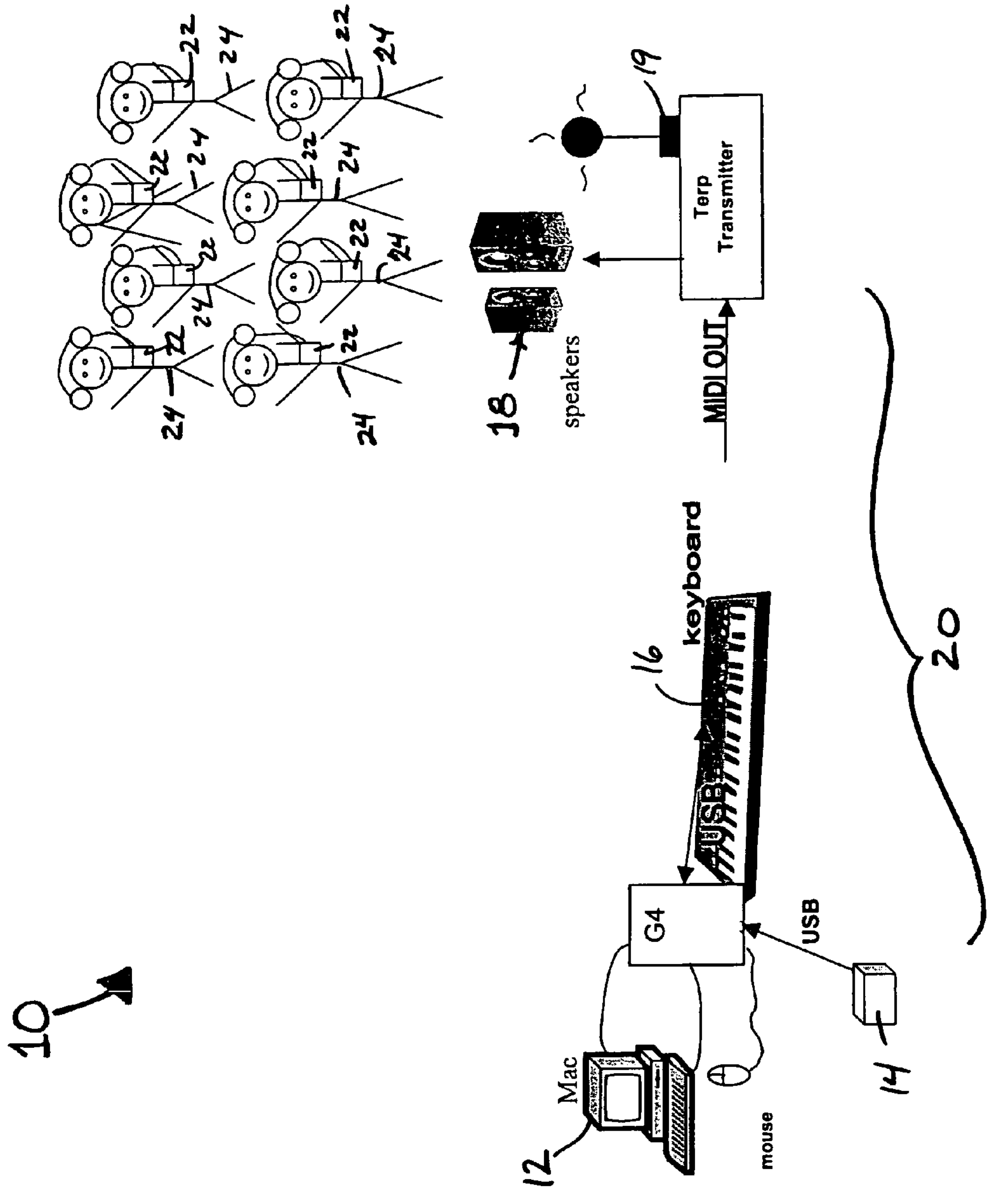
FIG. 1 illustrates an embodiment of a multi-channel, sampling broadcast system according to an embodiment of the invention.

FIG. 1 illustrates an embodiment of a multi-channel, sampling broadcast system 10. The system 10 can be used, for example, to direct a plurality of dancers arranged into various groups to perform a choreographed dance routine. A wireless transmission system 20 includes a personal computer 12, a digital media read/write unit 14, a MIDI piano keyboard 16, stereo speakers 18, and a transmitter 19. The speakers 18 may be used to play performance music, background music, or to produce other sounds. The transmitter 19 is utilized to wirelessly transmit instructions to a plurality of audio playback units 22. The audio playback units may be in the form of specialized receivers worn by dancers 24. In this example, a plurality of dancers 24 are wearing audio playback units 22 that receive commands that are transmitted wirelessly from the transmitter 19. The playback units provide audio instructions to each dancer in the groups of dancers indicating when and how to move. Computer sequencing software run by the personal computer 12 ensures that each dancer will receive his or her instructions at the correct time.

A dictionary of suggestive and exact instructions has been developed which contains words and phrases that any person could understand and use to perform movements. Thus, untrained persons could participate in a choreographed event just by listening and responding to the commands. This dictionary includes encouragements, instructions for personal physical interpretation, for personal emotional interpretation, for direct movements, for directions, and for grouping. The instructions found in the dictionary are intuitive, easy to understand, and easy to follow. For example, personal physical interpretation instructions may include such phrases as: "walk backwards in the shape of a triangle", "draw a duck in the air", "hover around the center of the action", "waltz sideways", and "make a star while skipping". Personal emotional interpretation instructions could include "get angry at the floor", "flirt with the person next to you", "give a speech", and "beg someone for mercy". Direct movement instructions may include "run", "jump", "skip", and "glide". Examples of directional instructions include: "go to the red flag", "face the fountain", and "turn towards the door". Grouping instructions may include: "find two people and make a group of three", and "in single file follow the person waving his arm overhead". Instructions grouped as "encouragements" may include: "faster", "slower", "keep going", "with gusto", and "quietly". Commands to play some of these words and phrases could be broadcast to one or more groups of dancers or performers during an event, so that the choreographer can see how a portion of an overall piece would look. Alternately, a certain sequence of commands could be broadcast to one or more groups of performers that corresponds to an entire performance piece. Each performer can belong to one or more groups, and an individual performer may belong to a group of one. In addition, it may be possible for a performer to be switched from one group to another during a performance. Since each dancer does not have to memorize a sequence, a choreographer utilizing the system can see the dance ideas performed right away, as opposed to having to rehearse each of the movements of the routine for hours and hours before being able to see the overall results.

Figure 2:
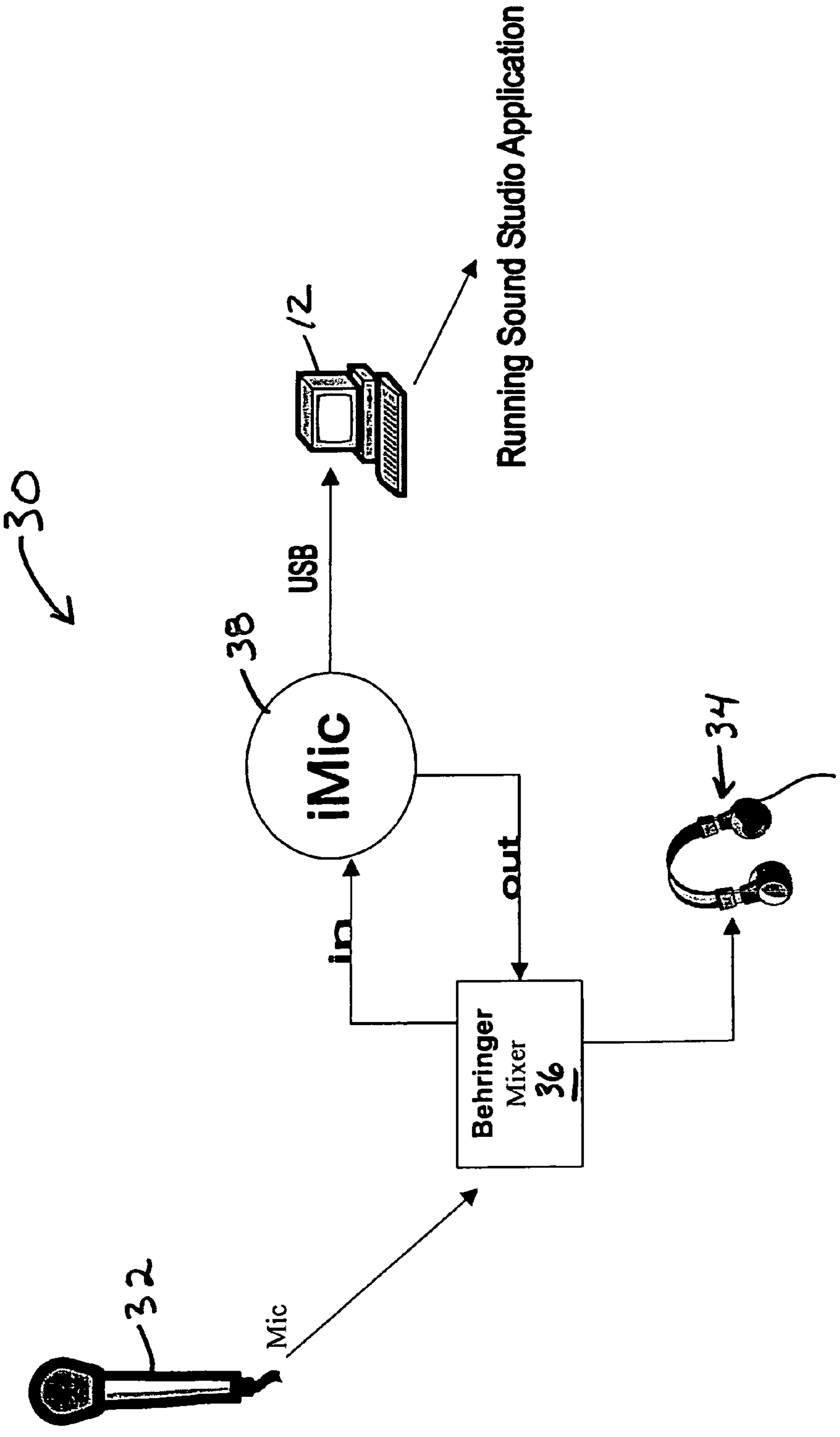
FIG. 2 illustrates a recording configuration according to the invention for making audio samples of instructions for use in performing a choreographed piece.

FIG. 2 illustrates an embodiment of a recording configuration 30 for making audio samples of instructions for use in performing a choreographed piece. A microphone 32 and headset 34 are connected to a Behringer mixer 36 for recording MP3 audio samples of instructions, which may be for a particular choreographed piece. The Behringer mixer 36 is connected to the personal computer 12 through an iMic device 38 that provides feedback to the mixer, and it is connected via a USB connector to the personal computer 12. The personal computer 12 may be an APPLE MACINTOSH® computer, which is then utilized to store the audio instructions for the piece. It should be understood, however, that any digital device, such as a WINDOWS® compatible system that is capable of generating and storing MP3 files or other digital audio files, could be used. The audio instructions are next recorded onto media cards (not shown) and then inserted into each audio playback unit 22 (see FIG. 1). As explained above, when an event is initiated commands are transmitted by the wireless transmission system 20 and received by the audio playback units 22, which then play the audible instructions for each of the performers.

Figure 3:
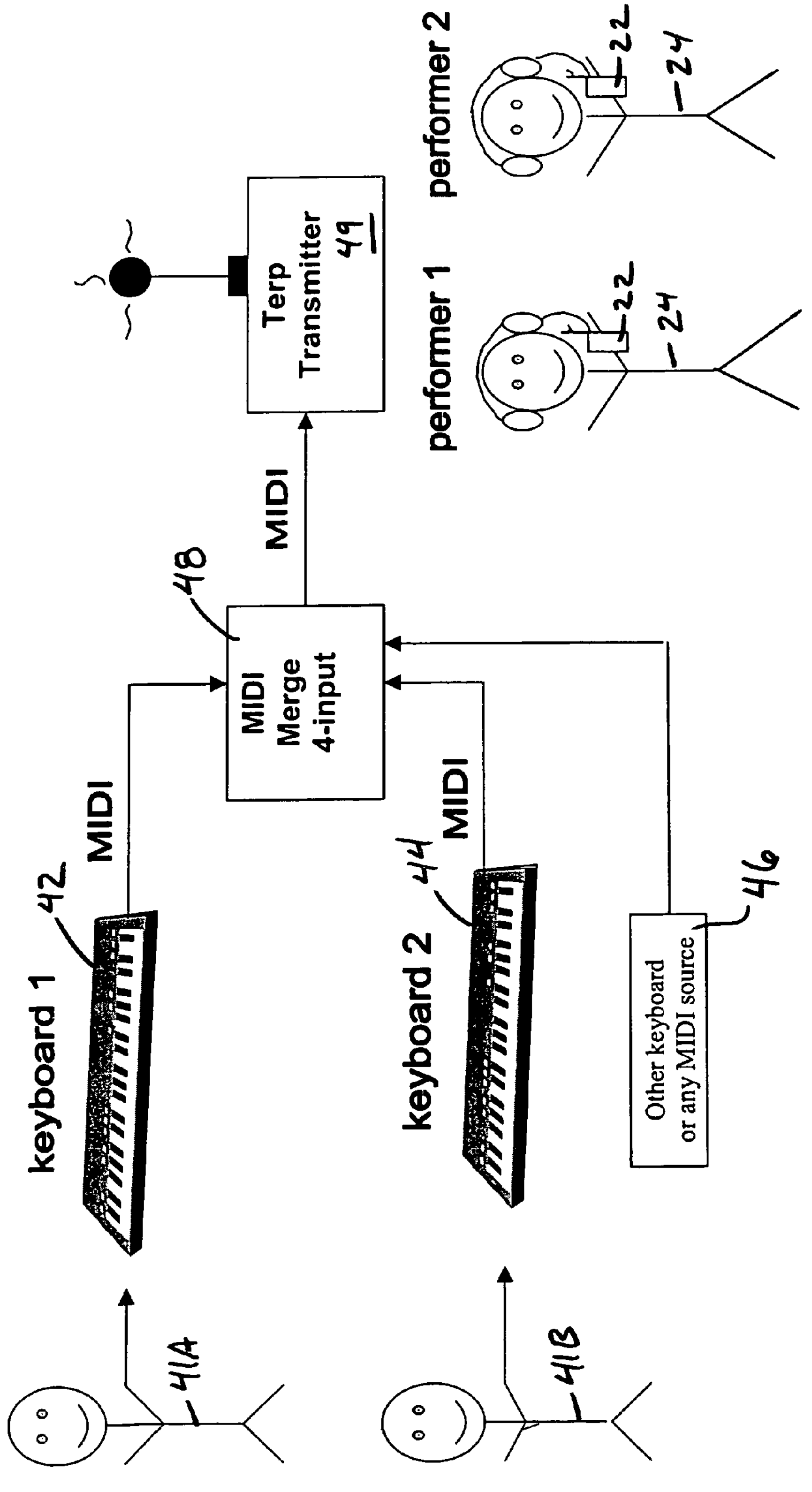
FIG. 3 shows an embodiment according to the invention of a configuration for creating and transmitting command signals in real-time for creating a choreographed demonstration event.

FIG. 3 shows an embodiment of a configuration 40 that could be used to create and transmit commands for choreographing a demonstration event. A first MIDI keyboard 42, a second MIDI keyboard 44, and a another keyboard or MIDI source 46 are connected to a MIDI merge device 48. A plurality of choreographers 41A, 41B utilize the keys on the MIDI keyboards, and/or other control inputs associated with the MIDI source 46, to generate commands that are broadcast by the transmitter 49 to audio playback units 22. The audio playback units 22 receive the commands and provide audio instructions to a plurality of dancers or performers. As explained above, each of the dancers or performers understands what the words and/or instructions mean and is able to respond in real-time. The words and phrases may be broadcast in one or more languages, such as French or Japanese, that is understandable to each dancer or performer and/or group of dancers or performers.

Referring again to FIG. 1, a preferred embodiment of the system includes an APPLE MACINTOSH® computer 12 utilized to compose, store and generate a choreographed piece. A software program such as PROTOOLS® or similar program that includes digital audio and/or MIDI record and playback features could be used to create the instructions and commands for an event. Specialized TERP™ software, discussed below, or other specialized software could also be used. In an embodiment, the sequencing software can be written to comply with the standard Musical Instrument Digital Interface ("MIDI"), or it may be a custom application written specifically for such a system.

The audio playback units 22 are capable of playing MP3 digital files, and include a microprocessor or other controller unit. The playback units 22 include headsets with speakers that are small enough to be comfortably worn by each dancer or performer. The receiver and headphone unit is capable of stereo or mono MP3 playback, and uses 8 megabyte (Mb) or 16 Mb digital media such as "SmartMedia" flash memory cards (not shown) that use a standard "FAT-12" file system. All of the audio files that need to be played are loaded onto the flash memory cards. Thus, the actual audio instruction files do not have to be transmitted. Such a receiver unit can be used with any type of computer system. Each of the receivers 22 includes volume up and down buttons, an on-off switch, an internal lithium-ion rechargeable battery that is capable of at least eight hours of runtime, a sophisticated battery level monitoring device, and battery charging circuitry with power-in and charge-complete LEDs.

In an implementation, the set of actions to be performed are recorded as spoken words in standard MP3 audio format, and stored as files on the flash memory media cards. The receivers 22, and thus the dancers 24, are assigned or arranged into groups as defined by a configuration file on the flash memory cards. Digital commands are broadcast on different channels, wherein each channel corresponds to one group of receivers and thus to a group of dancers. Different performers can be part of different groups at different times during a performance, which may be controlled by software code running on one or more of the playback units 22. The commands for the transmitter may be written in JAVA code or other programming language. The wireless transmission system 20 may send digital commands via a standard 900 Mhz radio link, which is controlled by the computer sequencing software loaded on the personal computer 12. It should be understood that transmission systems utilizing, for example, "Bluetooth" or "WiFi" technology could also be used. The transmitter unit 19 may accept data for transmission as proprietary packets on Recommended Standard-232 ("RS-232") or as standard MIDI messages. The receivers for a particular channel pick up the transmitted instructions and accordingly play the audio MP3 file or files stored on their media cards. The dancers then hear audible commands in their headsets and respond accordingly.

In an embodiment, the communications link is one-way between the transmitter system and the receivers or audio playback units 22. In an alternate advantageous embodiment, there is a two-way communications link between the transmitter system and playback units. The two-way communications link permits each playback unit to report statistics of the radio link, such as signal strength reception, to the transmitter system. For example, a test mode could be used to ensure that each playback unit is in range of the transmitter system before a performance is initiated. In addition, a check mode could be entered periodically during a performance to ensure that all of the playback units are still in range. Further, other status information could be garnered from the playback units, and updates could advantageously be made to the files on the flash memory media cards housed within each playback unit by wirelessly transmitting such changes, instead of having to manually update each memory card.

During operation, the transmission system 20 transmits a signal that signifies who, when, and what, to the receiver units 22 worn by the performers. The signal is received by the microprocessor included in each playback unit. The microprocessor contains all of the instructions, and triggers an audible language instruction to be played in the headphones for execution by the dancers. For example, a pre-recorded MP3 file containing voice directions may be played for a performer. The program of a choreographed performance will thus consist of a number of instructions (for example, 10 to 20), or a long series of instructions (for example, 1000 instructions per hour) that may be transmitted over one or more channels.

As explained above, the commands can be generated from a written specification that is transcribed using customized software on the personal computer 12, or by using a commercial music composition program. A choreographer may use the personal computer 12 to change sequences of the actual sound waveforms shown on the screen of the computer display monitor by clicking on them with a cursor and dragging them to new positions. The sound waveforms may also be available from an object oriented menu. Alternately, or additionally, the commands can be generated on a MIDI keyboard to manipulate the positions and actions of the actual performers in real-time. In yet another implementation, the commands for a particular performance could be generated by interacting with a model of the behavior and movement of the performers as shown on a second screen. Another advantageous feature that may be included is the capability to use a second display monitor to display a visual representation of the performance as it is occurring. This permits the choreographer to view a representation of an event or performance when people move from one position to another in real time.

Figure 4:
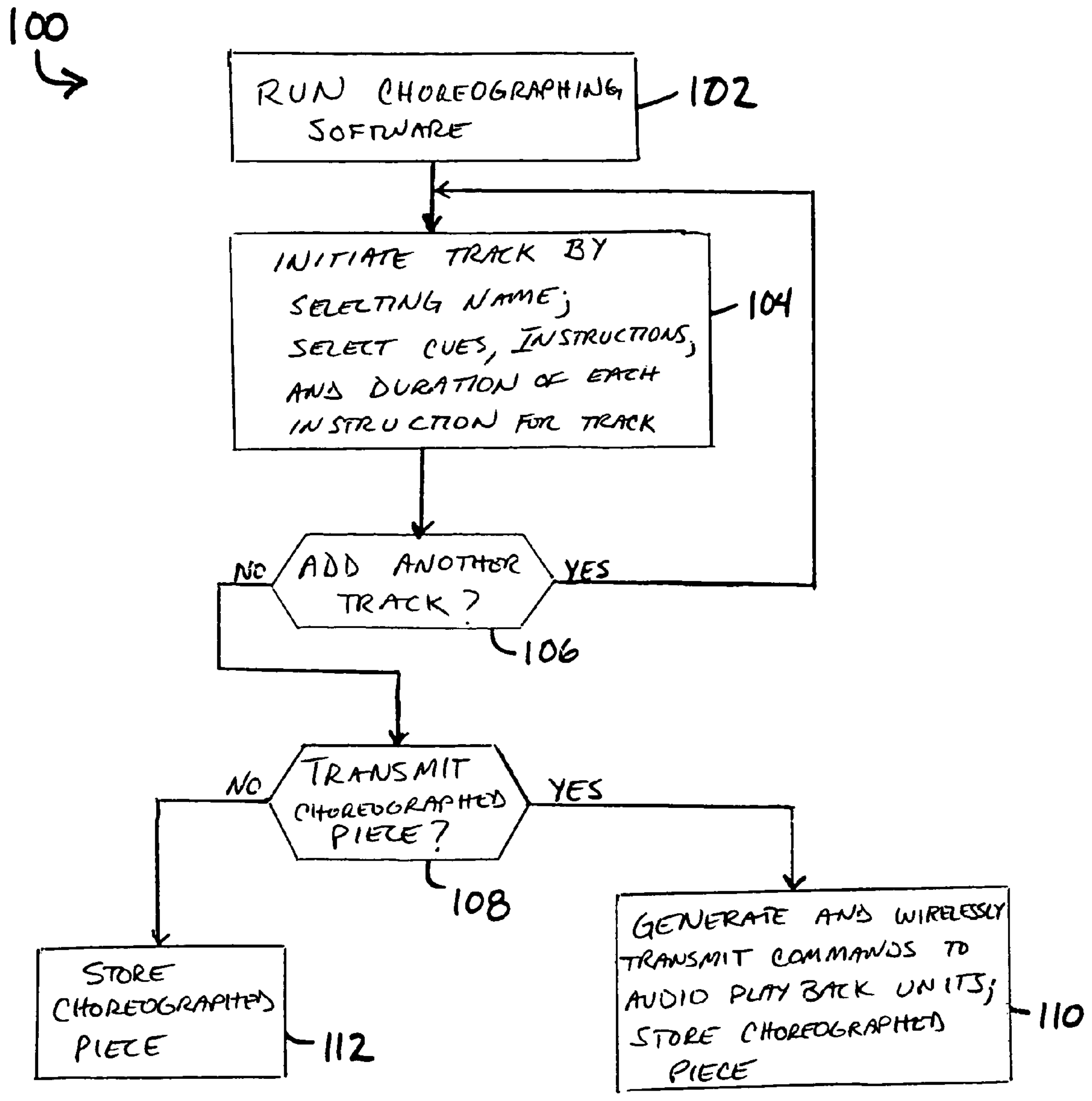
FIG. 4 is a simplified flowchart illustrating an embodiment of TERP™ choreographing software according to the invention for running on a personal computer.

FIG. 4 is a simplified flowchart 100 illustrating an embodiment of a TERP™ choreographing software program, which in this example is run 102 on a personal computer. In a preferred embodiment, object oriented menus are presented to the choreographer to create the choreographed piece, and the choreographing or performance software permits the choreographer to make selections by using input devices such as a keyboard and/or mouse. In an implementation, the choreographer starts the process by opening a new file and naming a track, and then selects cues, instructions and the duration of each instruction for that track 104. The track then includes a performance sequence that may consist of movement instructions, states, and properties which will be discussed in detail below. The choreographer then decides whether or not to add another track 106. If not, she may choose to transmit the choreographed piece 108, in which case command signals are generated and wirelessly transmitted 110 to the audio playback units. The choreographed piece may also be stored at this time for possible playback at a later date. If she chooses not to transmit the choreographed piece in step 108, then it is stored 112, for example, in a memory location on the personal computer.

Figure 5A:
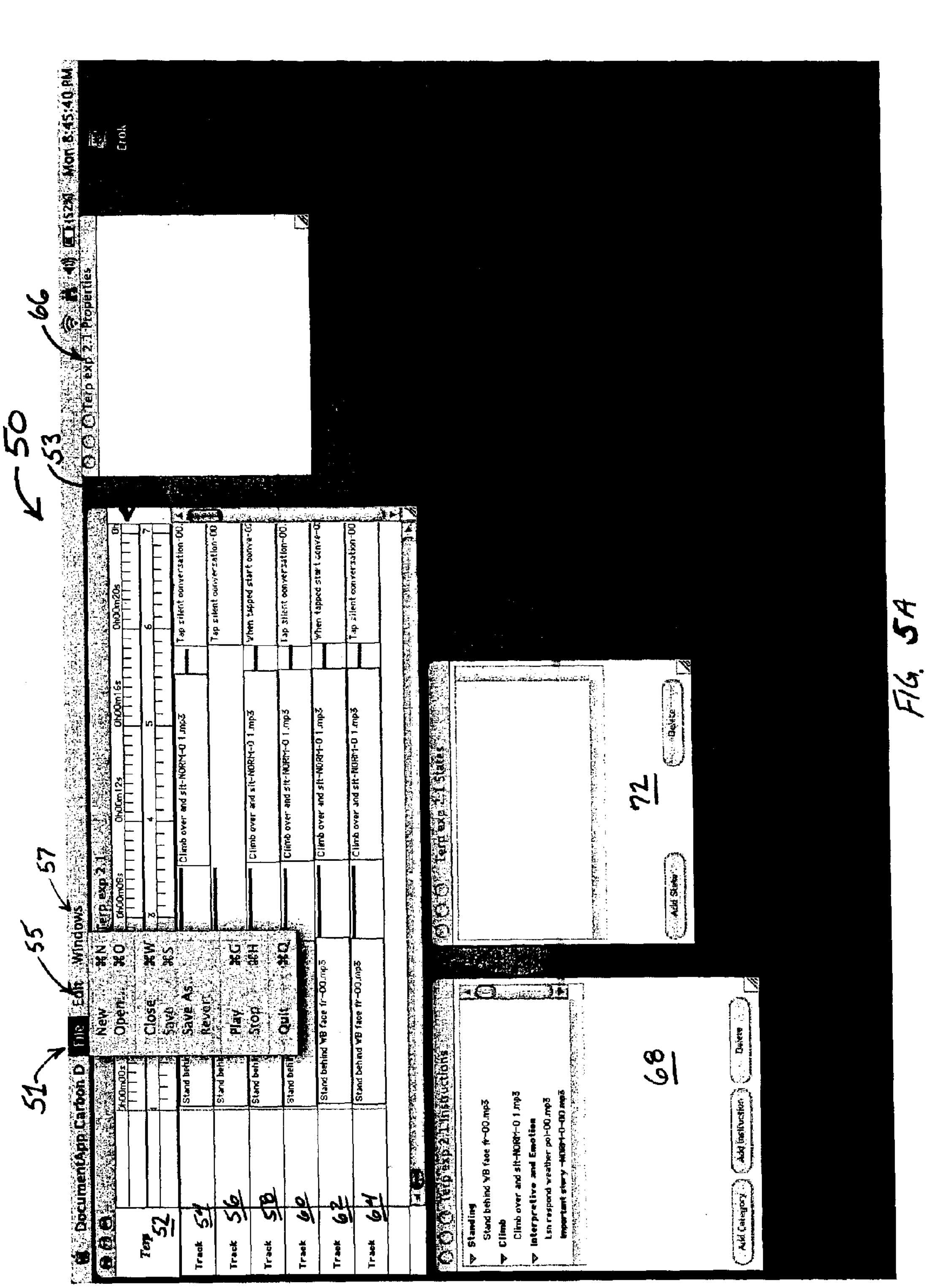
FIGS. 5A to 5C are screen shots of a computer screen of input menus and/or windows of an embodiment of a TERP™ software program according to the invention that allows a choreographer to create a performance piece.
Figure 5B:
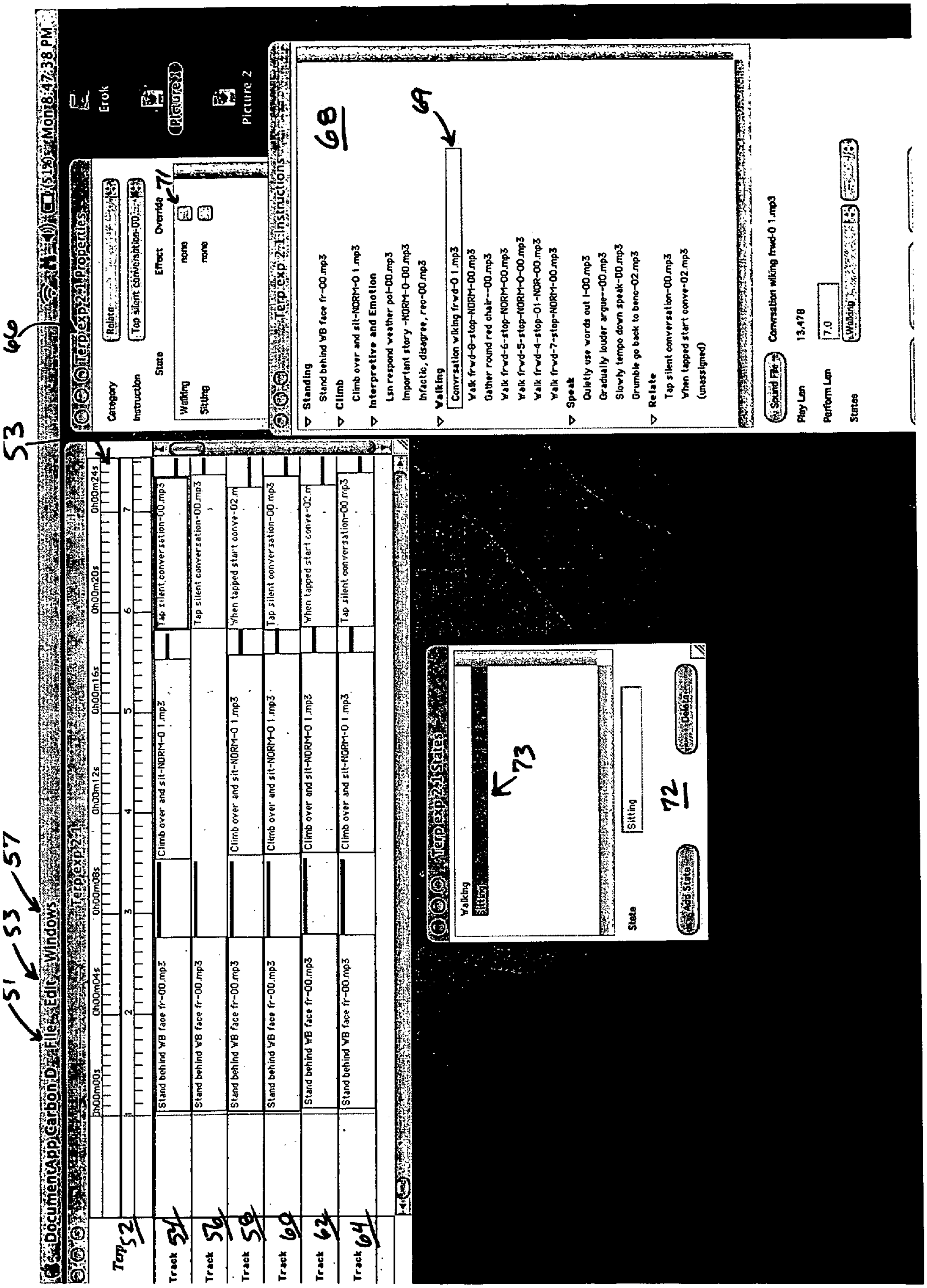
Figure 5C:
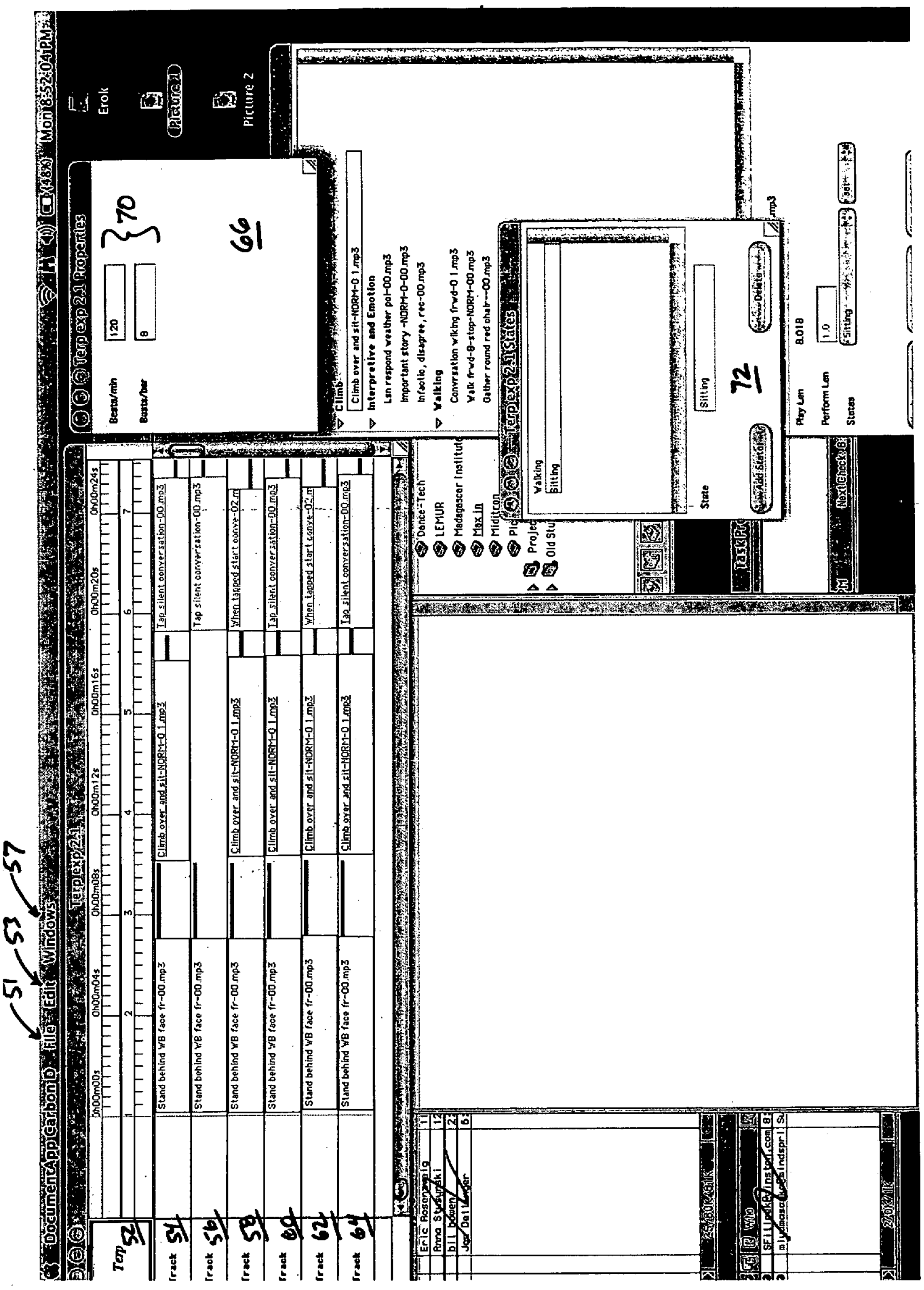

FIGS. 5A to 5C are screen shots of exemplary input menus and/or windows of an embodiment of the TERP™ software program that may be displayed on a computer screen for a choreographer to enable her to create a performance piece. The software enables the choreographer to generate a written representation of a performance piece, and as a result can be used as a preview tool. In particular, a choreographer can create a written description of synchronized actions for a plurality of performers, which helps her to visualize the piece before it is actually performed.

FIG. 5A shows an input screen 50 having the "File" drop down menu 51 opened, wherein several selections can be chosen including opening an existing file or creating a new file. Other functions, such as close, save as (revert), play (stop), and quit are also available. Predetermined key combinations can be performed to obtain desired functions, such as holding down the "Cmd" and "N" keys to open a new document.

FIG. 5A also depicts a "Terp" box 52, six tracks 54, 56, 58, 60, 62 and 64, a "Properties" window 66, an "Instructions" window 68, and a "States" window 72. Each of the tracks 54 to 64 can all be assigned a unique name, and each track represents a separate channel that contains one or more instructions. The relationship of bars and/or beats, which relate to the duration of an instruction or to a sequence of instructions, is set by clicking the "Terp" box 52 and then setting the appropriate fields in the "Properties" window 66, which will be explained in more detail below. A timeline 53 is also depicted that includes rulers for indicating the real-time duration of instructions, and indications for the bars and/or beats. In an implementation, the timing of instructions is measured from the end of each instruction. For example, the instructions "go to the red flag" (10 seconds) "raise your arms" means that the performer has 10 seconds to go to the red flag before the next instruction, "raise your arms", is executed.

The "Edit" command box 55 can be chosen to reveal a drop down menu (not shown) to select actions to "add tracks", "select all", "delete selected tracks", to change "preferences" and to "test" the choreographed piece. A user may also use key combinations to perform the desired actions, such as "Cmd-J" for adding tracks. To delete tracks, a user would click or shift-click on track indicators (appearing on the left side of the document) and then select Edit→Delete Selected Tracks, or use the key combination "Cmd-K". To add cues to tracks, the user can Cmd-click in the appropriate tracks. New cues come up as unassigned. Edit-Preferences may be used to set a serial port to which the program will output.

The "Windows" command box 57 can be selected to obtain a drop down menu (not shown) that includes selections to "zoom in horizontally", "zoom out horizontally", "zoom in vertically", and to "zoom out vertically". The drop down menu for the Windows box 57 also has selections to "show instructions", "show conditions", and to "show properties".

FIG. 5B shows an opened "Instructions" window 68 that has been moved to the right side of the computer screen. The Instructions window is displaying categories such as "Standing", "Climb", "Interpretive and Emotion", "Walking", "Speak" and "Relate". Selections under these categories, such as "conversation walking forward" 69 which is found under "Walking", can be chosen to appear in one or more of the tracks 54-64. In particular, the cue parameters are accessed by clicking on a cue. Cue parameters are which Category and then which Instruction in the Category to assign to the cue, and a selected Instruction may affect one of the States. For example, the "States" window 72 in FIG. 5B is open and highlights the "Sitting" state 73. The sitting state is affected by some instructions such as "climb over and sit", which may be chosen under the "Climb" category in the Instructions window.

FIG. 5C shows the "Properties" window 66 open. As mentioned above, the relationship of the bars and/or beats (duration information) is set by clicking the "Terp" box 52 and then filling in the desired beats per minute and beats per bar in the "Properties" window 66. In this example, the "Beats/min" and "Beats/bar" input boxes 70 are depicted, and a user has chosen 120 beats per minute and 8 beats per bar. The Properties window 66 permits a user to edit the show, and to track or cue parameters.

Track parameters may be accessed by clicking the track name (on left side of the document). States that are set by the current cue, or an earlier cue in the timeline, may be shown in a color that is different than other displayed colors, such as red. The cue name can also be underlined in the timeline. Clicking an "Override" check box 71 (shown in FIG. 5B, in the Properties window 66) will clear the State for this and subsequent cues.

Referring again to FIG. 5B, the Instruction window can be used to create Categories, to assign colors to various categories, to add Instructions to the Categories, to assign MP3 files to the Instructions, and to edit the effects on States for the Instructions. In an implementation, Category parameters are the category name and color. In addition, Instruction parameters are the assigned sound file, the play length (computed automatically, which is typically not available for editing), the perform length (the time it takes to perform an instruction), and the State effects. An Instruction can set a State, clear a State, or have no effect on a State.

As shown in FIG. 5C, the State window 72 permits a user to create or add States. States are effects caused by Instructions (such as the state of walking or having one's arms up in the air). In an implementation, if a Cue in a Track is assigned an Instruction which sets a State, subsequent Cues in that Track will show as underlined and that State will be a red color in the cues' property list. That State will be red in color until an Instruction which clears the State is encountered in that Track, or if the State is overridden in a subsequent Cue's properties.

Referring again to FIG. 5A, in the File 51 drop down menu, selecting the "Play" command (Cmd-G) causes the timeline to begin moving to the left. As a Cue passes the current time line (which may be indicated with a stationary yellow vertical line), play data is sent out the serial port to the transmitter to cause the Cue's sequence of Instructions to be played by the audio playback units corresponding to that Track. The Track number of the Cue corresponds to a group number of the audio playback units. The Stop selection (Cmd-H) stops playback. The Cut and Copy selection copies the currently selected Cues into a cut buffer. The Paste selection will paste the Cues at a selected insertion point (which may be the last point clicked in the document).

The choreographing software may include several enhancements, such as an artificial intelligence capability for providing translations, and/or to augment the choreographer's judgment. For example, English directions may be translated into Japanese, and the software may be capable of indicating to a choreographer that a certain sequence of movements would not be possible or would be very difficult for a dancer to perform. For example, as a piece is being created, the software may be capable of indicating that a particular selected sequence of movement instructions would be very difficult for a dancer to perform (For example, a dancer should not be asked to perform a leap immediately after assuming a sitting position).

The choreographing software may also include the capability to synchronize outside events with the performance. For example, the movements of groups of performers could be synchronized with the movement of robots, the cueing of a band, the bursting forth of water from fountains, and the like.

The embodiment of the TERP™ software tool described above allows a choreographer to easily create and play a choreographed piece, and permits performers to quickly and easily move about to perform the piece. The software tool may be further enhanced to include one or more advantageous features. In particular, for each movement instruction, five option items may be offered that include "SUBSTITUTE", "CHANGE", "FOLLOW", "PRECEDE", and/or "KEEP OR DROP". The SUBSTITUTE option would be used when a command such as "run" is chosen, to offer the user other moving instructions like "walk" or "skip". If the category of instructions was static shapes, such as "hands on your head" then SUBSTITUTE would suggest "right arm front, left arm back." CHANGE displays the list of primary instructions, not including follow up instructions or preceding instructions, that permits a user to chose to change from one kind of event to another. For example, from a moving instruction to a static shape instruction. The FOLLOW option displays all the instructions which usually follow a given instruction. For example, if the instruction "run" has been selected, then FOLLOW offers "faster", "keep going" or "to the red flag". The PRECEDE option results in displaying all the usual PRECEDE instructions that are normally used for the chosen instruction. For example, if "walk" has been selected, then PRECEDE offers "get ready", or "face the red flag", or "find a partner". The KEEP OR DROP option queries if the physical condition of the previous instruction should be kept or dropped. For example, if "sneak up on the person closest to you" has been selected just after "hands over your face", then the KEEP OR DROP option will query if the "hands over your face" instruction should be dropped.

In another beneficial variation, the TERP™ software is capable of automatically updating the options in each menu. For example, when a particular instruction is used often in certain circumstances, such as in FOLLOW or PRECEDE for any particular instruction, then such a popular instruction should go to the top of the list. When an instruction is not used for a predefined long period of time, the program may query if it should be deleted from the list. A choreographer will be given the option to "save this instruction until further notice" instead of deleting it so that important yet not often used instructions are saved. Deleted instructions may be saved on a clipboard until the time they are finally deleted.

In another beneficial embodiment, the TERP™ software program is capable of learning new instructions and suitably categorizing them. Also, one or more of the following options may be offered. A GLOBAL UNISON option permits any instruction to be broadcast across all channels so that the instruction is performed by all participants in unison. The performance in unison is maintained whether or not FOLLOW and PRECEDE are used in separate channels to change what happens before or after the GLOBAL UNISON option. An IF-THEN FUNCTION allows formulation of specific sets of instructions. For example: "If channels 1, 2, and 3 are turning, then channels 6 and 7 sit down". A CANON OR DELAY FUNCTION operates by choosing a section across the plurality of channels to create a canon. For example, if the function is: "10 second canon starting from channel one through channel 8", then the first event of this segment in channel 2 occurs 10 seconds after the first event of this section in channel one. Likewise, if the function for any given section is: "5 second canon starting from channel 2, then 4, then 8", then the remaining channels will not be involved in the canon function.

The choreographing system aids in the dynamic placement of people in a manner that saves time, is fun, and is efficient. The choreographing tool may be used as an interactive rehearsal and production tool for theater, filmmaking and dance. In the case of filmmaking, the tool may be used to create instant crowd scenes. In the case of theater use, it may be used to interactively and quickly facilitate the marking of stage placement and direction of motion. For dance choreography, the tool may be used to edit sequences and to see the results quickly. The tool may also be used when a person is creating virtual environments using chromakey technology, computer animation, and live action. The tool can be used in each of these situations because it provides for the precise placement and movement of performers, for example in a blue screen studio situation in a manner completely synchronized with the virtual action and the accompanying music.

The tool could also be used in several other entertainment applications. For example, the tool may be used to create a game for people to play involving interactively choreographing ideas with friends, for example, by using one or more MIDI keyboards. Another example would be creating a virtual game show, or a completely interactive exercise program. Or people may acquire a pre-recorded TERP™ piece for an event like a child's birthday party.

In a particular application of the choreographing tool, a group of selected participants, each of whom is unrehearsed, wears small headsets and follows and interprets the pre-defined instructions. The instructions are included in a conceptual dictionary of over 400 entries. The participants all cooperate to obey the instructions resulting in a choreographed crowd scene that may tell a recognizable story without rehearsal. Included in such an event is a MIDI-controlled synchronization with music, water fountains bursting, and town lighting. As an expressive experience of motion, participants find themselves in a new world of physical discovery at once private, yet one that builds to an exhilarating, unprecedented group event under the direction of a choreographer. Such an event could easily take place in several cities, and may even be performed simultaneously. Thus, although humans interpret as individuals, we are all part of a bigger picture. This picture is the human experience expressed through body movements. It is also envisioned that the choreographing tool could be used to create an event that changes the environment. In fact, as performers move through the experience, the environment responds.

A preferred implementation of the software tool thus utilizes object oriented programming to generate commands for a choreographed piece in real-time, includes artificial intelligence to facilitate the creation of the piece, and includes the capability to synchronize outside events with the movements of the performers.

What is claimed is:

1. A method for choreographing and synchronizing movement of individuals for an event, which method comprises:

providing each individual of a group with a wireless audio unit; and transmitting body movement instruction signals to the audio units of each individual of the group, wherein the audio units are configured to receive the signals and to play audio directions for each individual that correspond to choreographed and coordinated body movements to carry out the event.

2. The method of claim 1, wherein the body movement instruction signals are transmitted to the audio units under the control of a suitably programmed computer and wireless transmitter, wherein the audio directions comprise a set of pre-defined instructions.

3. The method of claim 1, wherein the body movement instruction signals include voice commands, and wherein the wireless audio playback unit is further configured to store the instruction signals.

4. The method of claim 3, wherein the voice commands include coded commands that are selected from a compilation that is provided to the individuals for interactive or non-interactive individual movement or vocalization.

5. The method of claim 3, which further comprises synchronizing the voice commands with at least one of music accompaniment, visual effects or changing scenery.

6. The method of claim 1, wherein the event is an artistic performance, an exercise regimen or an interactive game, and the movements of the individuals of the group are choreographed and coordinated to carry out the event.

7. The method of claim 1, which further comprises providing choreographic movements to additional individuals that do not have audio units to further enhance the event.

8. The method of claim 1, wherein at least some of the individuals are remotely located from others in order to achieve a multi-geographical event.

9. A multi-channel system for choreographing and synchronizing movement of individuals, comprising:

a device including at least one display and input means for generating body movement instruction signals;

a transmitter for transmitting the body movement instruction signals over at least one channel; and a wireless audio unit provided to each individual of a group for receiving the body movement instruction signals, wherein the signals are interpreted by the audio units into audible body movement directions for each individual such that the individuals move in a choreographed and coordinated manner.

10. The apparatus of claim 9, which further comprises a second display for showing a representation of the movement of the performers.

11. The apparatus of claim 9, wherein the wireless audio receiving unit comprises a microprocessor, a digital media card, and a headset with audio speakers.

12. The apparatus of claim 9, wherein the device for generating body movement instruction signals comprises at least one of a MIDI keyboard, a MIDI digital device, an APPLE® personal computer, and a personal computer running a WINDOWS® operating system.

13. The apparatus of claim 12, which further comprises a digital media read/write unit.

14. The apparatus of claim 9, which further comprises choreographing software provided on the device for generating body movement instructions, to facilitate creation of a choreographed event.

15. The apparatus of claim 9, wherein the audio unit is capable of two-way communication with the device.

16. A non-transitory computer readable medium, for generating a choreographed piece for transmission to individuals that carry wireless audio units, comprising instructions for causing a computer to:

provide at least one track and cues for defining a sequence of choreographing instructions over a timeline to generate a choreographed piece;

store at least a portion of the choreographed piece; and generate command signals corresponding to the choreographing instructions for transmission on at least one channel to the wireless audio units, wherein each wireless audio unit is associated with an individual of at least one group and is configured to translate the command signals into audio body movement directions such that a choreographed event can be performed.

17. The non-transitory computer-readable medium of claim 16, wherein the choreographing instructions include at least one of movement instructions, states, and properties.

18. The non-transitory computer-readable medium of claim 16, which further comprises instructions for causing a computer to generate optional command signals to synchronize outside events with the choreographed event.

19. The non-transitory computer-readable medium of claim 16, which further comprises instructions for causing a computer to learn and categorize additional choreography instructions.

20. The non-transitory computer-readable medium of claim 16, which further comprises instructions or causing a computer to automatically update movement instructions according to predefined popularity criteria.

* * * * *